Oct. 8, 1935.   R. N. GEFFROY   2,016,774
IMPLEMENT MOUNTING TRAILER FOR TRACTORS
Filed Jan. 26, 1935   4 Sheets-Sheet 4
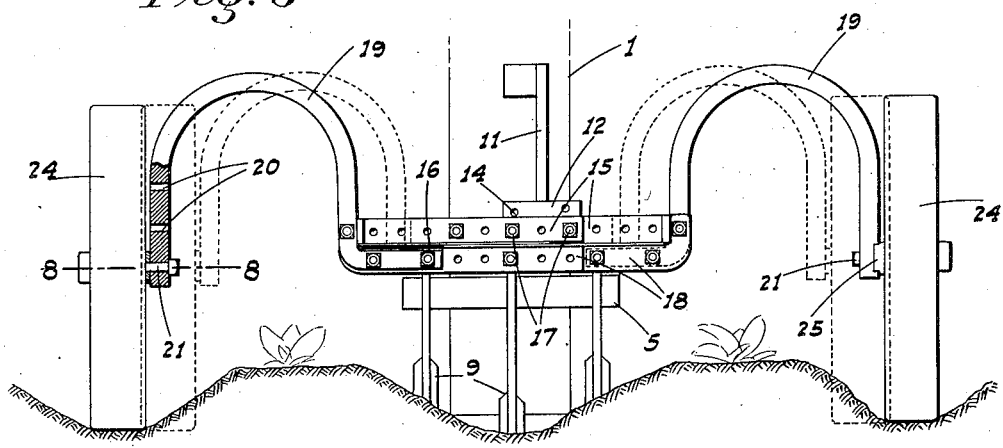
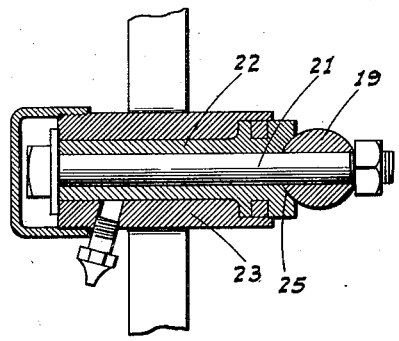
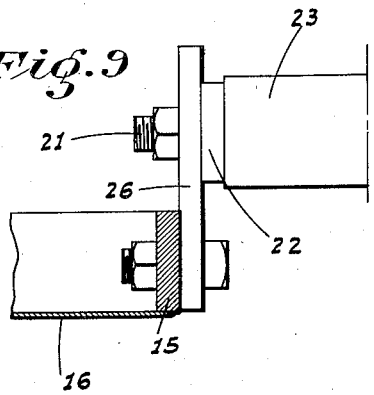
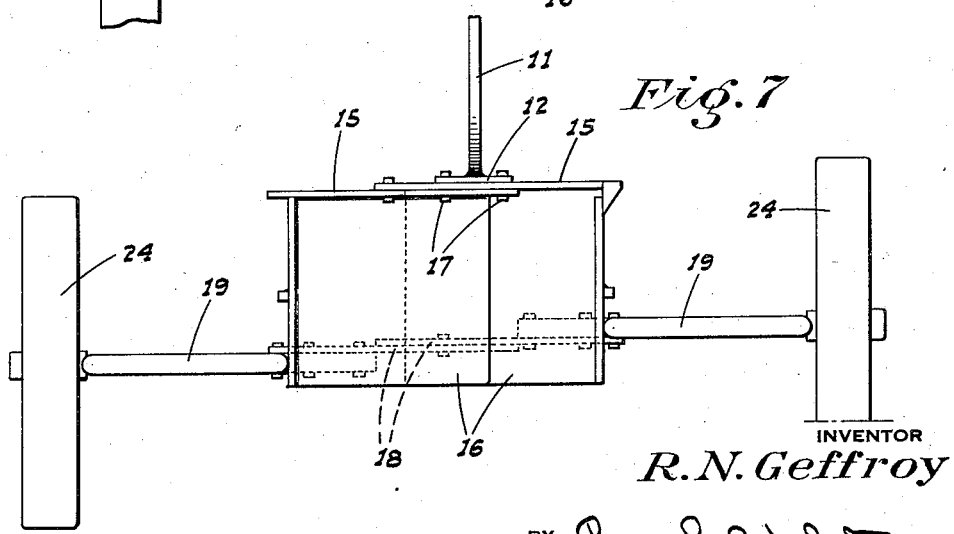
INVENTOR
R. N. Geffroy
BY
ATTORNEY Patented Oct. 8, 1935

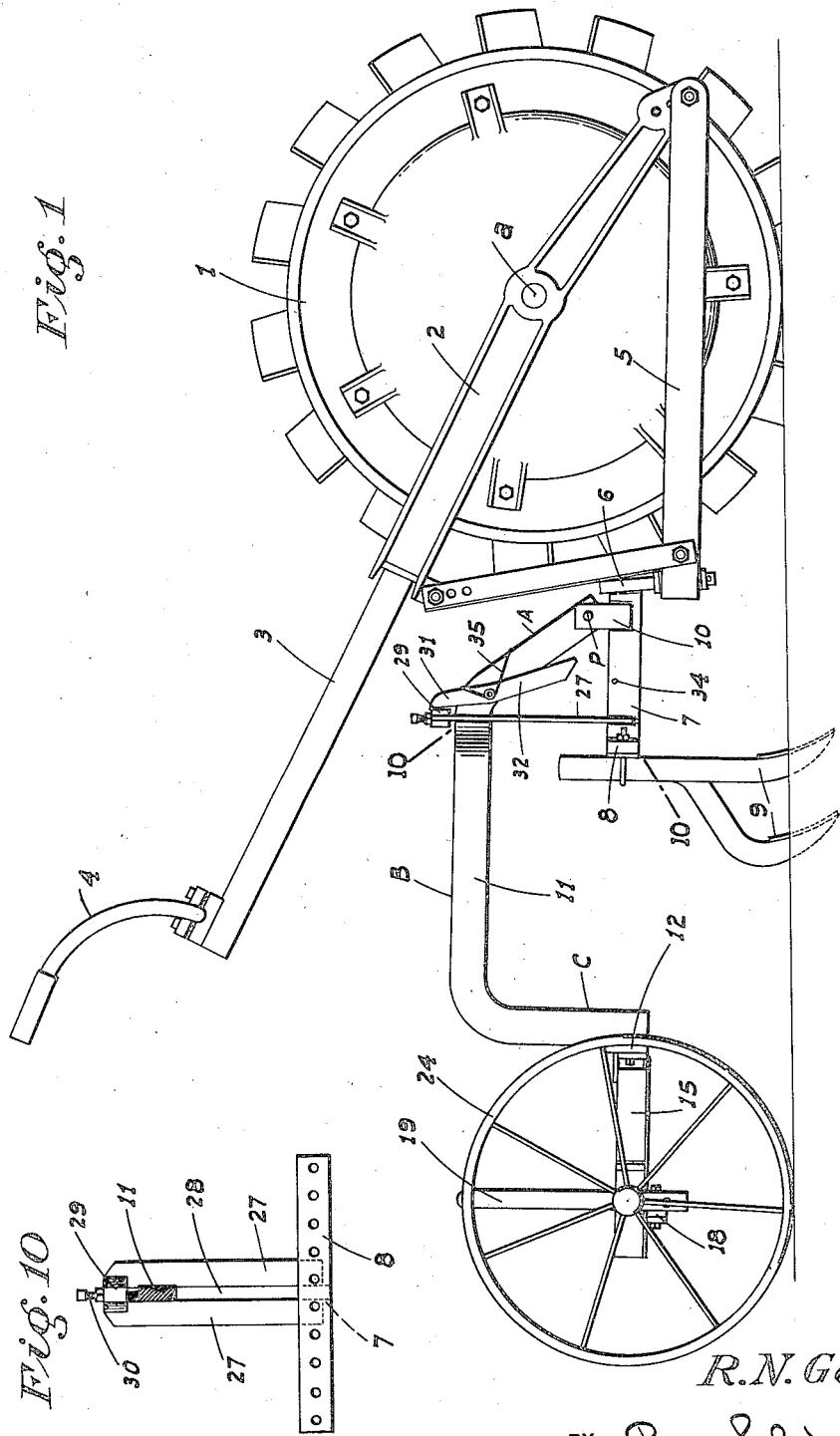

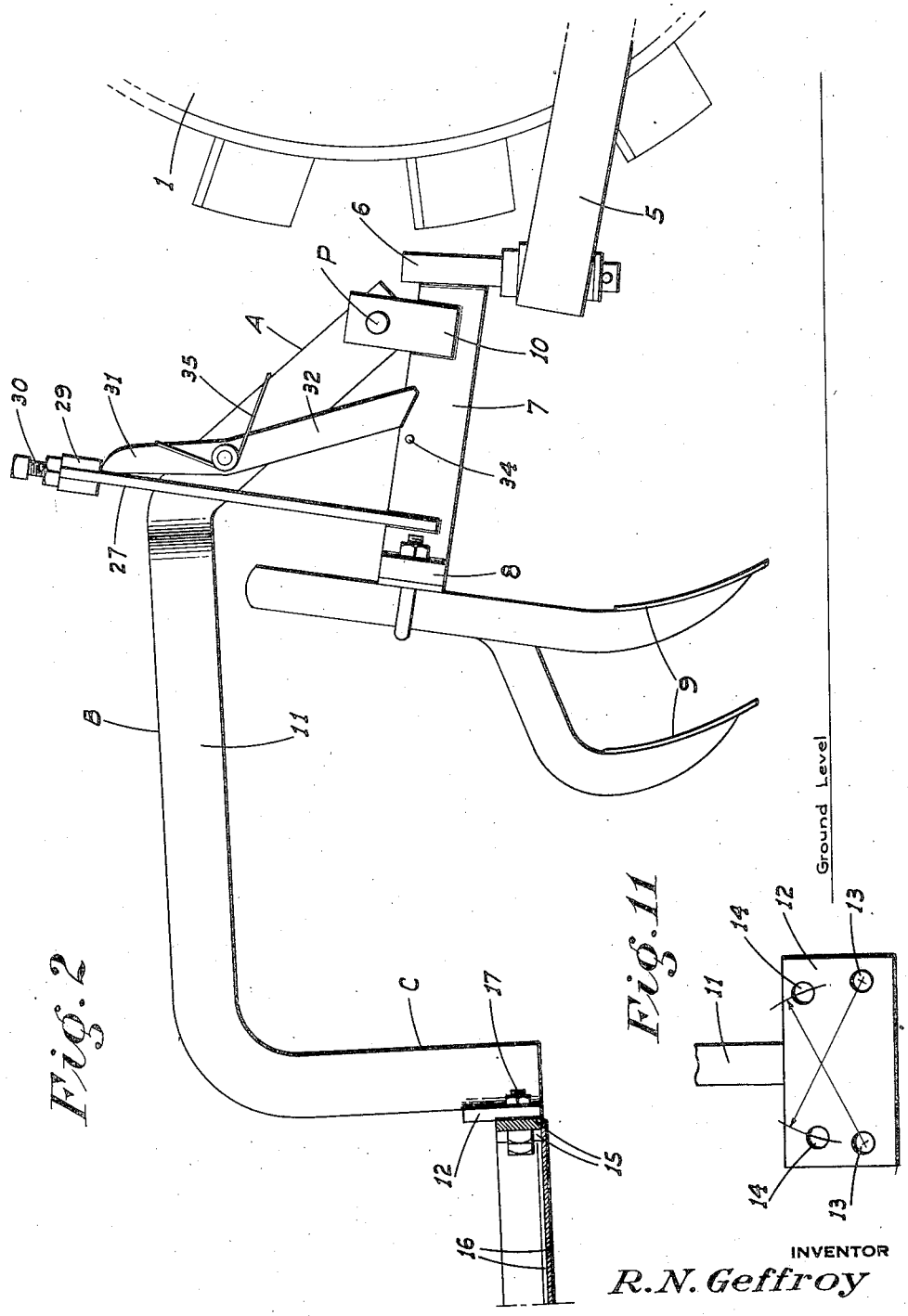

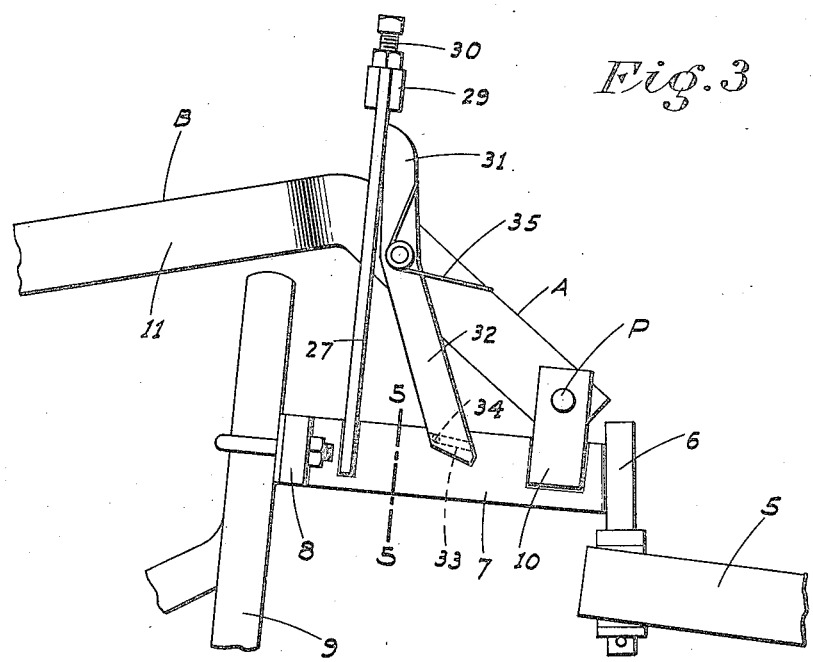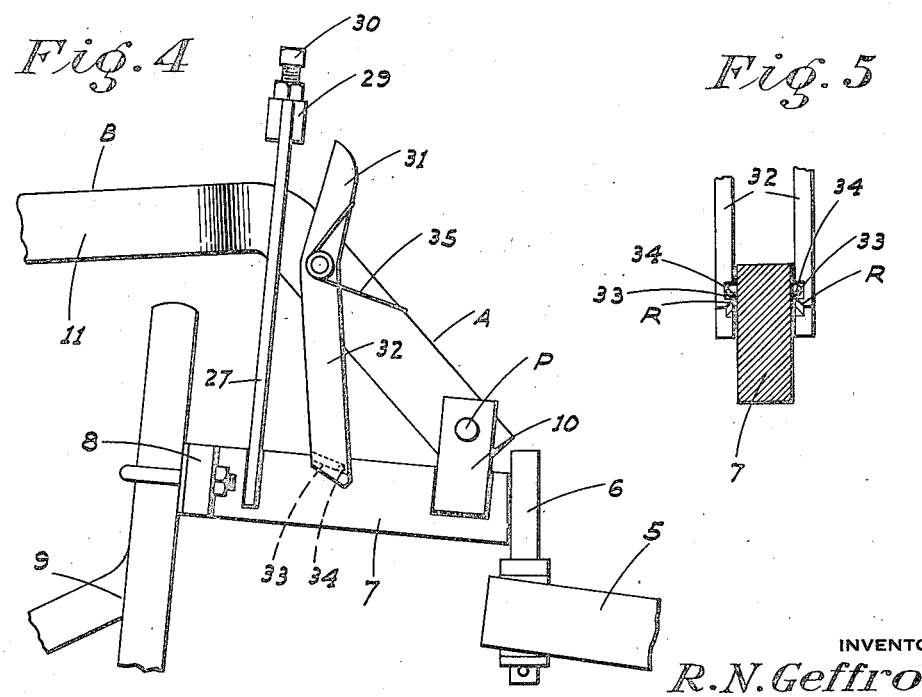

2,016,774

UNITED STATES PATENT OFFICE 2,016,774

IMPLEMENT MOUNTING TRAILER FOR TRACTORS

Ralph N. Geffroy, Stockton, Calif.

Application January 26, 1935, Serial No. 3,632

27 Claims. (Cl. 97—48)

This invention is a continuation in part of my pending application Serial No. 696,681, filed November 4, 1933. It relates to power driven agricultural implements and particularly to one of a small size for use on relatively small plots of ground which are too large for hand spading and cultivating and yet are too small to warrant the purchase of a full sized tractor and equipment, or the constant up-keep drain of a horse or other draft animal.

The principal object of my invention is to provide, in connection with a single wheel tractor, such as that shown in my Patents No. 1,807,784 and No. 1,987,676, an implement mounting and operator supporting attachment or trailer, so arranged that the operator can conveniently manipulate the tractor and tools from his stand on the device. The trailer is also arranged so that any desired type of tool can be readily applied thereto, and such tools may be easily and quickly lowered into or raised from the ground while the tractor is in motion by a simple easily and quickly performed operation on the part of the operator. Also the trailer is connected to the tractor in such a manner that turns of very small radius may be easily made either when the tools are working in the ground or when they are raised therefrom.

Also, the operator, being supported by and carried along with the device, does not have to walk alongside of the tractor, and as a result his physical energy is conserved and steering the tractor to maintain the tools in a straight line is greatly facilitated.

The trailer is supported on wheels, and another object of the invention is to mount the wheels so that their tread spacing may be easily altered to suit crop row spacing and other conditions; they may also be set at different transverse angles relative to the vertical plane of the tractor as the ground contour may require; and they may be independently adjusted vertically relative to the trailer which they support.

A further object of the invention is to produce a simple and inexpensive device and yet one which will be exceedingly effective for the purpose for which it is designed.

These objects I accomplish by means of such structure and relative arrangement of parts as will fully appear by a perusual of the following specification and claims.

In the drawings similar characters of reference indicate corresponding parts in the several views:

Figure 1 is a side elevation of the complete apparatus with the implements in operating position.

Figure 2 is a fragmentary side view of the device showing the tools raised from the ground and the catch engaged to prevent lowering of said tools.

Figure 3 is a similar view showing the first step in the releasing of the catch when it is desired to lower the tools.

Figure 4 is a similar view showing the releasing movement of the catch.

Figure 5 is a fragmentary enlarged cross section on the line 5—5 of Figure 3.

Figure 6 is a rear end view of the trailer.

Figure 7 is a fragmentary top plan view of the same.

Figure 8 is a fragmentary section on the line 8—8 of Figure 6, showing the wheel mounting.

Figure 9 is a fragmentary transverse section of the trailer platform showing a modified wheel-spindle support.

Figure 10 is a fragmentary transverse section on the line 10—10 of Figure 1.

Figure 11 is a rear end view of the trailer-platform supporting plate.

Referring now more particularly to the characters of reference on the drawings, the tractor comprises a single drive wheel 1, the power plant of the tractor being enclosed within the wheel substantially as shown in the aforementioned patents. An upwardly sloping side frame 2 is mounted on the tractor and extends across the rear side of the wheel. An upwardly sloping bar 3 projects rearwardly from the rear end of this frame, said bar having an adjustable handle-bar unit 4 of the bicycle type mounted on its rear end. The frame 2 supports another relatively low horizontal frame 5 which also extends across the wheel on its rear side and which is rigid with frame 2.

Turnably mounted in and extending upwardly from the rear cross bar of the frame 5 is a kingpin 6 having an upward and rearward slope of about five degrees to the vertical. Rigid with and projecting radially and rearwardly from the pin is a frame bar 7 to the rear end of which is rigidly secured a transversely extending bar 8. This bar 8 is drilled along its length as shown in Figure 10 to receive standard U-bolts by means of which the depending standards of various implements, such as cultivator teeth 9, may be rigidly strapped or bolted in place.

Secured to and upstanding from the bar 7 adjacent the pin 6 are ears 10 between which is pivoted as at P the adjacent end of a rearwardly projecting beam 11, which forms the main frame of the trailer. This beam has an initial upward and rearward sloping portion A merging into a substantially horizontal portion B which terminates in a depending rear portion C extending down to a level near the working level of the bar 7. The bar 11 is thus substantially in the form of a long flat arch, extending rearwardly over the bars 7 and 8 and the implements carried thereby, to a point some distance rearwardly of the same. The portion A of the beam and the adjacent end of the portion B are directly above the bar 7, but the major portion of the beam 11 is preferably laterally offset somewhat relative to the bar 7.

A transverse plate 12 is secured on the rear lower end of the beam 11 which is, provided with a pair of transversely spaced horizontally alined holes 13 and other holes 14 above the same, which are centered on arcs struck from the opposed holes 13, as shown in Figure 11. The plate 12 serves as the supporting means for transversely extending and vertically overlapping and separate edge frames 15 which support separate horizontally overlapping platforms 16. These platforms are of a size sufficient to support the feet of an operator in a natural standing position and who may then conveniently grasp and manipulate the handles 4, which are of course above and substantially overhang the platform, as shown in Figure 1.

The frames 15 are normally secured to the holes 13 of the plate 12 by removable bolts 17 so that the platform is mounted in a horizontal plane at right angles to the vertical plane of the tractor 1. If however (as when plowing close to trees, fences or the like) it is desired to set the tractor at a transverse tilt relative to the platform, one holding bolt 17 is removed, the platform and tractor are swung relative to each other about the remaining bolt as an axis and said one bolt is then replaced in the corresponding hole 14 of the plate 12.

Other vertically overlapping frame bars 18 are mounted on and under the edge frame 15 and platforms toward their rear end, which are also adjustably bolted together. These bars 18 besides bracing the platforms against downward deflection serve as securing means for the adjacent ends of transversely extending goose neck or arch axles 19 whose outer ends terminate substantially on a level with the bottom of the bars 18. At its outer lower end each axle has a vertical row of holes 20 to selectively receive a bolt 21. This bolt passes through and clamps a spindle 22 in rigid connection with the axle, the hub 23 of the wheel 24 turning on the spindle, as shown in Figure 8. The inner end of the spindle is formed with a saddle 25 which sharply surrounds the axle (which is of circular form) and prevents the spindle from turning. The holes 20 provide necessary vertical adjustment of the platform, as for instance when working strawberries, in which case the wheels are set in the highest position on the axles for the tools to work in the furrows between rows and in the lowest position when the tools are working the crests only.

The use of arched axles enables rows of growing crops to be straddled without the plants being disturbed or damaged, while maintaining the platforms close to the ground. They may be used double as shown or singly, in which case and referring to Figure 6, the riding platform is closed and moved to the right until the pad 12 connects to its left extreme. The wheel 24 is then mounted on plate 26, Figure 9, and set pointing down instead of up as shown. Due to the right-hand offset in beam 11, the left wheel 24 will then run in the middle row shown in Figure 6. If the use of arched axles is not required, they may be removed and the short plates 26 may be secured to the side portions of the platform frames 15. These plates support the bolts 21 for clamping the spindles 22 directly against the plates, as shown in Figure 9, and may be set pointing up or down as conditions warrant. For instance, when plowing, one axle is raised and the other lowered. Or these plates may be removed and the spindles 22 with associated wheels 24 may be bolted directly to platform frames 15 of the trailer.

It will be noted from Figure 6 that both the transverse frame elements 15 and the bars 18 are drilled with a number of equally spaced bolt holes throughout their length so that by removing and replacing the securing bolts in different holes, a great range of lateral adjustment of the frames and consequently of the wheels may be obtained. This enables the structure to be effectively used for all different crop row spacings and for all other working conditions. Also, since the wheels are independently adjustable, they may be set different distances from the plane of the beam 11 if conditions should require such uneven setting.

The entire trailer unit, including the implements, can swing about the pin 6 as an axis. Raising or lowering the implements from the ground is accomplished by vertical manipulation of the handle-bars 4, since said bars, the tractor frame, and the implement supporting beam form a rigid unit as far as vertical movement is concerned, turning on the axle $a$ of the tractor as an axis. With such movement of the implement a minimum accompanying movement of the platforms is had on account of the pivotal connection of the supporting beam 11 of the latter with the bar 7.

In order to hold the implements clear of the ground when desired without maintaining a hold-up pressure on the handles I provide the following arrangement:

Rigid with and upstanding from the bar 7 are pieces 27 spaced to form a slot 28 through which the beam 11 projects just ahead of the offset, said bar being capable of a certain amount of vertical movement in the slot. A forwardly overhanging block 29 is mounted on the pieces 27 at the top of the slot, said block supporting an adjustable set screw 30 which depends into the slot to engage the top of the beam 11. An upstanding U-shaped dog 31 is pivoted on and straddles the beam 11 on the portion A, said dog when the beam is at its highest position in the slot extending upwardly alongside the front face of the block 29, as shown in Figure 1.

Said dog below its pivot and on both sides is formed with forwardly angles laterally springy extensions 32 which are provided on their faces nearest the bar 7 with substantially horizontal grooves 33 adjacent its lower ends, said grooves extending diagonally of each extension as shown in Figures 3 and 4. The lower edge of each extension is preferably inwardly beveled as shown at R in Figure 5.

A rounded stub pin 34 is mounted in and projects from the sides of the bar 7 to initially engage said grooves adjacent their rear ends. A spring 35 of suitable character is associated with the dog to urge the same against the block 29.

In operation, when the tools are engaged with the ground the beam 11 is then at the top of the slot 28 or is engaged by the adjacent end of the set screw, and the dog 31 is then in its released position and bears against the forward face of the block 29, as shown in Figure 1. The tractor can of course turn relative to the trailer about the king-pin 6, the steering being effected by the operator on the platform by swinging the bar 3 to one side or the other. When it is desired to raise the tools from the ground it is only necessary for the operator to lift up on the handles 4, which causes the frame 5 to be tilted upwardly and likewise tilts the frame structure on which the tools are mounted. At the same time the beam 11 rises in substantially less proportion.

This raising of the bar 7 also raises the block 29 relative to the dog 31, so that the upper end of the latter clears the lower end of the block and said dog is free to project under the block, as shown in Figure 2, said dog being urged to such position by the spring 35. Owing to the particular arrangement and connection of the frame members 7 and 11 relative to each other however, as well as the fact that the frame 5 also swings upwardly about the axis of the tractor wheel, considerable vertical movement of the tool supporting frame takes place before the block 29 has actually moved up the relatively small distance necessary to clear the dog. This is on account of the fact that as the rear end of the frame 5 is tilted up, the pivotal point P also of course tilts up so that as the tool supporting structure is raised the bar 11 is also raised but to a lesser extent. It is then obvious that the tool supporting frame is held raised and cannot be again lowered unless the dog is withdrawn from under its catch block.

This is accomplished in the following manner:

A further lifting movement is first imparted to the bar 3 through the medium of the handles, which of course also raises the bar 7 still higher or from the position shown in Figure 2 to that in Figure 3. As the bar 7 thus raises it swings about the pivot P as an axis. This causes the members 27 which are rigid with said bar to be tilted toward the tractor somewhat and it engages and swings the dog 31 forwardly, and its lower extensions 32 rearwardly about the pivotal connection of said dog with the beam 11.

This additional raising of the bar 7 and the accompanying tilting of the dog extensions, as above described, brings the pins 34 up so that before the bar 7 reaches its highest position, said pins engage the lower beveled edges R of the extensions 32 at the rear ends of same. With a further final raising of the bar 7, the pins spring the extensions outwardly until as said bar reaches the topmost point of its movement the pins snap into the grooves 33 adjacent their rear ends. Then, when the bar 3 is lowered down the pins remain and ride in the grooves causing the dog to be swung away from the block 29, as shown in Figure 4.

By the time the pins have reached the forward ends of the grooves and leave the same, the block has been lowered to a point below the top of the dog, so that when the latter is released it will engage the front face of the block instead of under the same. The tools may thus enter the ground to the desired depth for which the implement is set and which depends on the setting of the screw 30 or the vertical adjustment of wheels 24. It will thus be seen that withdrawing the tools from the ground and allowing the same to again re-enter the ground are accomplished by very simple and quickly performed operations on the part of the driver, without it being necessary to halt the forward movement of the tractor.

Apart from enabling the raising and lowering of the implements to be easily effected, the construction of the lift mechanism above described has another feature of advantage. When working the tractor under a comparatively heavy load, should the power wheel suddenly start slipping the implements are not carried down deeper as the power wheel digs in with its slipping, but are left in their normal position, the wheel only hinging downwardly. A lift on the handle-bar corrects this situation instantly since it lessens the original load and materially increases the tractive effort over the load drag.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In combination with a tractor, an implement carrying trailer pivoted on the frame of the tractor for swinging movement in a horizontal plane, said trailer including supporting wheels, and means mounting the wheels for angular adjustment as a unit in a vertical transverse plane.

2. A structure as in claim 1, with means included in part with said mounting means for adjusting the wheels laterally.

3. In combination with a tractor, an implement carrying trailer connected to and disposed rearwardly of the tractor, wheels supporting the trailer, said trailer including a longitudinally extending frame beam, a transverse vertical plate secured on the rear end of the beam, said plate having vertical pairs of transversely spaced bolt holes the upper ones of which are the same distance from the opposed lower holes as the distance between said lower holes, a frame structure on which the wheels are mounted having a transverse portion abutted against the plate, and bolts removably placed through said portion and a transversely spaced pair of the holes.

4. In combination with a tractor having a rearwardly projecting frame, means mounting said frame for swinging movement in a vertical plane, an implement carrying frame projecting rearwardly from the tractor frame and mounted thereon for vertical movement therewith, a beam pivoted in unitary connection with said implement frame adjacent its forward end and projecting rearwardly thereof, and an operator supporting platform mounted on and projecting rearwardly from the beam; said implement frame mounting means including a substantially vertical pivot connection about which said frame may swing.

5. In combination with a tractor having a rearwardly projecting manipulating bar, means mounting said bar on the tractor for swinging movement in a vertical plane, an implement carrying frame rearwardly of the tractor and mounted in connection with said bar to swing therewith, an operator supporting platform disposed rearwardly of said frame, the rear end of said manipulating bar being above and adjacent the front end of the platform for manipulation by the operator thereon, a beam rigid with the platform and extending forwardly in overhanging relation to the implement frame, and a transverse pivot connection between said beam and the frame adjacent the forward end of the latter.

6. In combination with a tractor having a rearwardly projecting manipulating bar, a transverse pivot about which said bar may swing vertically, an implement carrying frame mounted on the tractor for vertical swinging movement with the bar whereby raising of the bar will raise the implement frame and the implements carried thereby, a platform to support an operator mounted in connection with the implement frame rearwardly thereof and from which the bar is operable, said platform being directly supported from the gound, a longitudinal beam rigid with the platform and pivoted in unitary connection with a transverse axis on the implement frame adjacent the tractor, automatically functioning catch means between the beam and the implement frame holding the latter against lowering movement when once raised a predetermined distance, and means to release said catch means functioning with a further raising of the implement frame beyond a holding position.

7. In combination with a tractor having a rearwardly projecting frame, a transverse pivot about which said frame may swing vertically, an implement carrying frame disposed rearwardly of the tractor and including a longitudinally extending bar connected to the tractor frame for vertical swinging movement therewith, a longitudinally extending beam above said bar and pivoted in unitary connection therewith adjacent its forward end, wheels supporting the beam at its rear end, a catch block rigid with the bar and disposed above the beam, and a dog pivoted on the beam to engage under the block when the bar has been raised a certain distance.

8. A structure as in claim 7, with means between the bar and dog to move the latter clear of the block with a raising of the bar a certain distance beyond a catch engaging position and holding said dog in a clear position with a subsequent lowering of the bar to an amount sufficient to bring the top of the dog above the lower edge of the block.

9. A structure as in claim 7, with a pivot for the dog, a forward laterally springable extension rigid with the dog below the pivot adapted to overlap the side of the bar after the latter has been raised beyond a catch engaging position, said extension having a diagonally extending groove near its lower end and in its face adjacent the bar, and a pin projecting from said bar in position to spring the extension laterally and snap into the groove adjacent its rear end when the bar has been additionally raised, said pin and groove being arranged relative to the dog pivot so that with a lowering of the bar from said raised position, the pin will remain in the groove and will cause the dog to swing on its pivot so as to move away from and remain clear of the catch block as the latter is lowered with the bar until the latter has approached its fully lowered position.

10. In combination with a tractor having a rearwardly projecting manipulating bar, a transverse pivot about which said bar may swing vertically, an implement carrying frame mounted on the tractor for vertical swinging movement with the bar whereby raising of the bar will raise the implement frame and the implements carried thereby, a ground supported unit rearwardly of the implement frame, a longitudinal beam rigid with said unit and pivoted on a transverse axis on the implement frame, and releasable catch means between said beam and the implement frame to hold the latter against lowering movement when once swung upwardly and means acting on said catch means to release the same when the implement frame is raised to a further amount.

11. In combination with a tractor having a rearwardly projecting frame, a transverse pivot about which said frame may swing vertically, an implement carrying frame mounted on the tractor frame for vertical swinging movement therewith whereby raising of the tractor frame will raise the implement frame and the implement carried thereby, a wheel-supported beam transversely pivoted in unitary connection with and projecting rearwardly from the implement frame, means to thus swing and raise said frames, and means including a releasable catch device to hold the frames against lowering movement when once raised a predetermined amount.

12. A structure as in claim 11, with means to release said device when the frames are tilted upwardly a further amount.

13. In combination with a tractor, an implement carrying trailer connected to and disposed rearwardly of the tractor, wheels supporting the trailer, said trailer including a longitudinally extending frame beam, a transverse member at the rear end of said frame beam and rigid therewith, and frames on which the wheels are mounted secured to said transverse member for separate lateral adjustment and independently for angular adjustment as a unit in a vertical transverse plane.

14. In combination with a tractor having a rearwardly projecting manipulating bar, a transverse pivot about which said bar may swing vertically, an implement carrying frame mounted on the tractor for vertical swinging movement with the bar whereby raising of the bar will raise the implement frame and the implements carried thereby, a platform to support an operator mounted in connection with the implement frame rearwardly thereof and from which the bar is operable, said platform being directly supported from the ground, a longitudinal beam rigid with the platform and pivoted on a transverse axis in unitary connection with the implement frame adjacent the tractor, and automatically functioning catch means between the beam and the implement frame holding the latter against lowering movement when once raised a predetermined distance.

15. In combination with a single-wheel tractor having a frame, implements mounted in connection with and depending from the frame behind and alined with the wheel of the tractor, a relatively low operator supporting platform disposed rearwardly of and normally in line with the wheel and implements, means pivotally mounting the platform from the tractor frame for relative swinging in a vertical plane, axles rigid with and arching outwardly and upwardly from the opposite sides of the platform, to straddle spaced rows of growing crops, wheels at the outer ends of the axles, and spindles for the wheels secured on said axles and vertically adjustable thereon.

16. In combination with a single-wheel tractor having a frame, implements mounted in connection with and depending from the frame behind and alined with the wheel of the tractor, a relatively low operator supporting platform disposed rearwardly of and normally in line with the wheel and implements, means mounting the platform in connection with the tractor frame, axles rigid with and arching outwardly and upwardly from opposite sides of the platform, to straddle spaced rows of growing crops, and wheels mounted on the outer ends of the axles.

17. A structure as in claim 16, with means to adjust the axles laterally whereby to accommodate said arches to rows of different spacings.

18. In combination with a single-wheel tractor, a relatively low implement carrying trailer connected to and disposed rearwardly of the tractor in centralized relation therewith, transversely spaced wheels to the sides of the trailer, said means for one wheel comprising an arched axle rigid with and projecting outwardly from the adjacent side of the trailer to straddle an adjacent row of growing crops, and a spindle for said wheel projecting outwardly from the outer end of the axle.

19. In combination with a single wheel tractor, an implement carrying trailer connected to and disposed rearwardly of the tractor, said trailer including a single longitudinally extendng frame beam disposed in central alinement with the tractor, a transverse member at the rear end of said beam and rigid therewith, separate frames secured to said transverse member for separate lateral adjustment and wheels to the sides of and supporting said frames.

20. A structure as in claim 19, with plates forming foot-platforms mounted on the frames; said plates when the frames are disposed close together, overlapping each other whereby when said frames are separated the plates will still form a continuous platform.

21. In combination with a tractor having a frame element across its rear end, an implement mounting and operator supporting trailer attached to said element, said trailer including a bar extending lengthwise and centrally of the tractor, a substantially vertical pivot member on the front end of the bar turnably engaging said frame element, implement supporting means fixed with the bar, and a wheel supported beam extending rearwardly of the bar from overhanging relation therewith and pivotally connected thereto for relative swinging movement in a vertical plane.

22. In combination with a tractor having a frame element across its rear end, an implement mounting and operator supporting trailer attached to said element, said trailer including a bar extending lengthwise and centrally of the tractor, a substantially vertical pivot member on the front end of the bar turnably engaging said frame element, implement supporting means fixed with the bar, a beam extending rearwardly of the bar from overhanging relationship therewith, means pivoting the front end of the beam in unitary connection with the bar for vertical swinging movement relative thereto, and vertically adjustable wheels supporting the trailer at its rear end whereby the level of the trailer at such end may be adjusted relative to the ground independently of the implements.

23. In combination with a tractor having a frame element across its rear end, an implement mounting and operator supporting trailer attached to said element, said trailer including a bar extending lengthwise and centrally of the tractor, a substantially vertical pivot member on the front end of the bar turnably engaging said frame element, implement supporting means fixed with the bar, a beam extending rearwardly of the bar from overhanging relationship therewith, means pivoting the front end of the beam in unitary connection with the bar, the beam at its rear end being formed with a downward extension, a wheel supported platform for the feet of an operator mounted on and projecting rearwardly from the lower end of the extension whereby the operator may step from the ground onto said platform, and a manipulating bar projecting rearwardly from the tractor to a termination in substantially overhanging relation to the front end of the platform.

24. In combination with a tractor having a frame element across its rear end, an implement mounting and operator supporting trailer attached to said element, said trailer including a bar extending lengthwise and centrally of the tractor a substantially vertical pivot member on the front end of the bar turnably engaging said frame element, implement supporting means fixed with the bar, a beam extending rearwardly of the bar from overhanging relationship therewith, means pivoting the front end of the beam in unitary connection with the bar, a relatively low platform to support the operator projecting rearwardly from and rigid with the rear end of the beam, and vertically adjustable wheels supporting the platform.

25. In combination with a tractor having a frame element across its rear end, an implement mounting and operator supporting trailer attached to said element, said trailer including a bar extending lengthwise and centrally of the tractor, a substantially vertical pivot member on the front end of the bar turnably engaging said frame element, implement supporting means fixed with the bar, a beam extending rearwardly of the bar from overhanging relationship therewith, means pivoting the front end of the beam in unitary connection with the bar, a relatively low operator supporting platform rigid with and projecting rearwardly from the rear end of the beam, and a manipulating bar projecting rearwardly from the tractor to a termination substantially in overhanging relation to the front end of the platform.

26. A structure as in claim 25, with means to selectively alter the level of the platform relative to the ground without materially affecting the relative level of the tools.

27. In combination with a tractor, an implement carrying trailer connected to and disposed rearwardly of the tractor and including a longitudinally extending frame beam, a wheel-mounted operator supporting platform disposed rearwardly of the beam, and means connecting the platform and beam for relative angular adjustment in a vertical transverse plane.

RALPH N. GEFFROY.